F. REICHLE.
VEHICLE-SEATS.

No. 195,453. Patented Sept. 25, 1877.

Witnesses:
Alonzo Hughes
D. P. Cowl

Inventor
Ferdinand Reichle
by Myers & Co. Attys.

UNITED STATES PATENT OFFICE.

FERDINAND REICHLE, OF DETROIT, MICHIGAN.

IMPROVEMENT IN VEHICLE-SEATS.

Specification forming part of Letters Patent No. 195,453, dated September 25, 1877; application filed June 9, 1875.

*To all whom it may concern:*

Be it known that I, FERDINAND REICHLE, of Detroit, in the county of Wayne and State of Michigan, have invented certain new and useful Improvements in Seats for Vehicles; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to that class of seats for vehicles which are made detachable at will; and consists in so constructing such a seat and its supports that it is not only readily attached to or removed from the body of the vehicle, but, by a simple change of position, it is adjusted and held by the same supports either forward or backward, to make room, in the former case, for the occupants of another seat in the rear. In connection with this adjustable seat I employ an adjustable foot-rail, and the construction and operation of these two parts are fully described below.

Figure 1:
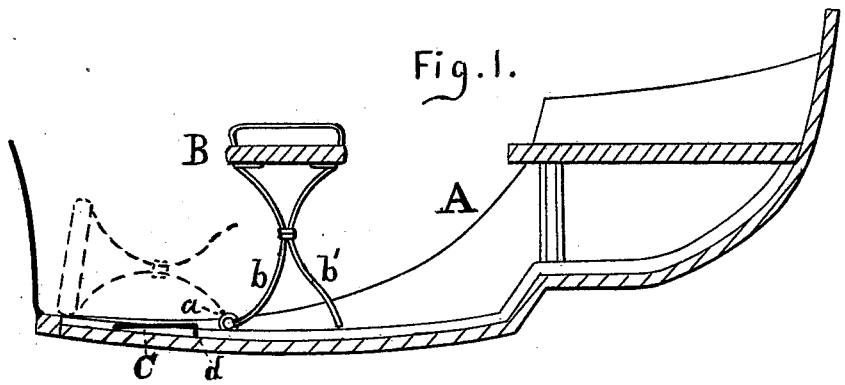
Figure 2:
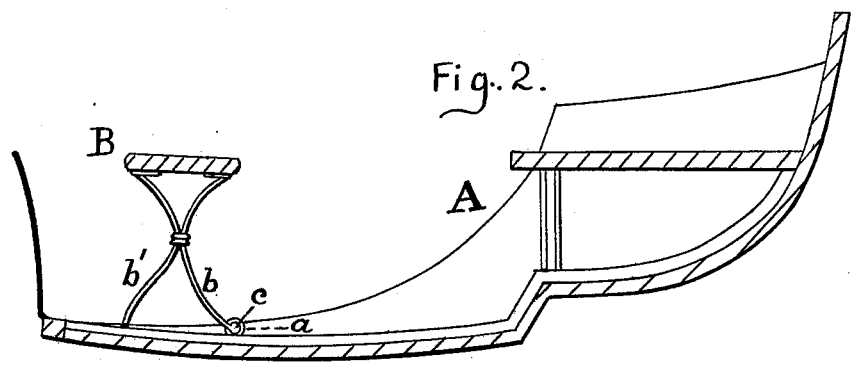
Figure 3:
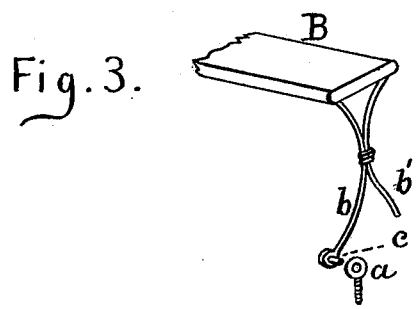

In the accompanying drawing, forming a part of the specification herein, Figure 1 represents a vertical section of the body of a carriage with my invention applied thereto. Fig. 2 represents the same, the detachable seat being reversed in position. Fig. 3 illustrates the connection of seat and carriage-body.

In the said drawing, A designates the body of the carriage, and B the detachable seat, having supports at the ends thereof, constructed as shown, with the parts $b\ b'$.

The bolts, indicated by $c$, are made solid with the parts $b$, and extend outward from the lower extremities thereof. The loops or eyes $a$ are fixed and secured to the frame or body of the carriage, so that the bolts $c$ pass through the eyes when the seat is coupled to the vehicle.

The supports $b$ are made somewhat pliable and springy, for the purpose of coupling, which is done by pressing them toward each other, so that the bolts $c$ may be inserted in the eyes $a$, and then allowing them to spring into position. The feet of legs $b'$ are free.

When the seat is reversed in position endwise, as shown in Fig. 2, it is brought forward of the line of the coupling, thus allowing space in the carriage for placing another seat, if desired.

When placed and coupled as seen in Fig. 1, the seat may be turned over out of the way, as indicated by dotted lines, the legs $b'$ being made simply to rest on the body or floor of the vehicle.

As an adjunct to the adjustable seat above described, is employed the adjustable foot-rail shown in elevation at C, Fig. 1. This rail extends across the body of the vehicle, and is bent in crank form at each end, the short extremities loosely entering the sides of the carriage-body. It is provided with a central stilt or prop, $d$, which supports it when in the position for use, as shown in Fig. 1. When the seat is in the position shown in Fig. 2, the occupant's feet may be braced against the dashboard, and the foot-rail, not being then required, is turned over forward and lies upon the floor of the carriage at the foot of the dashboard.

Having described my invention, I claim—

In combination with a vehicle, the detachable and adjustable seat B, provided with the spread ng supports $b\ b'$, the legs $b$ being provided with connections $a\ c$, and the legs $b'$ having their feet free, substantially as and for the purpose shown and described.

In testimony that I claim the foregoing as my own I affix my signature in presence of two witnesses.

F. REICHLE.

Witnesses:
 LANDING SMITHE,
 W. F. STONE.